March 13, 1956 G. F. SCHROEDER ET AL 2,738,433
A-C RATE GENERATOR
Filed Aug. 28, 1952
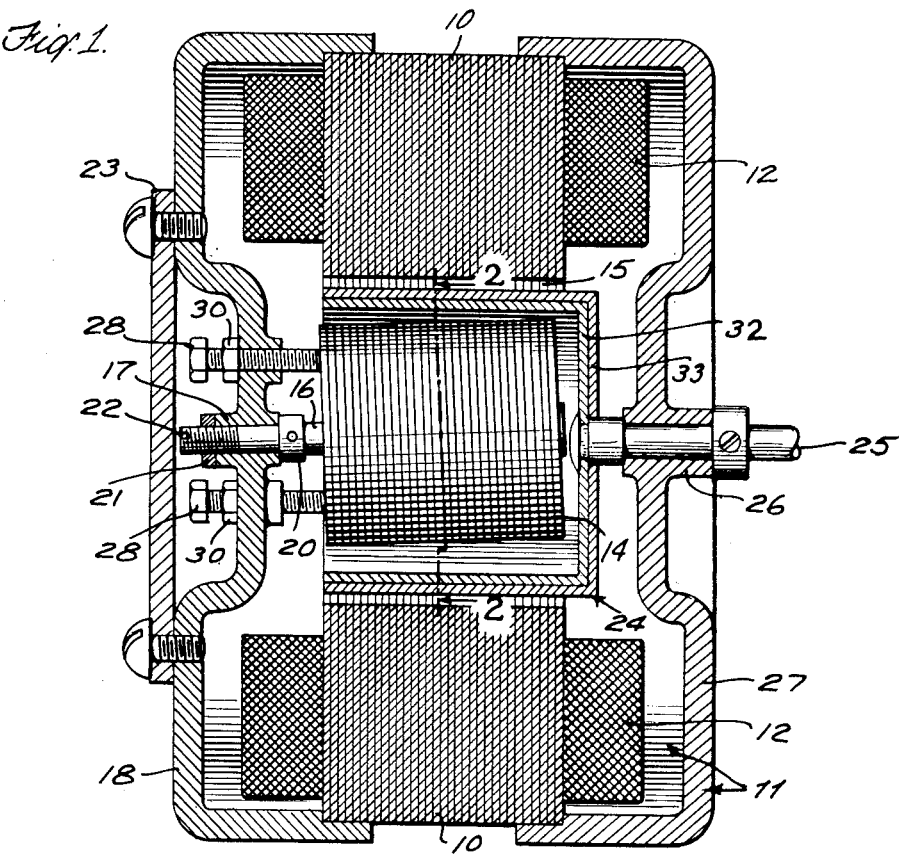
Fig. 1.
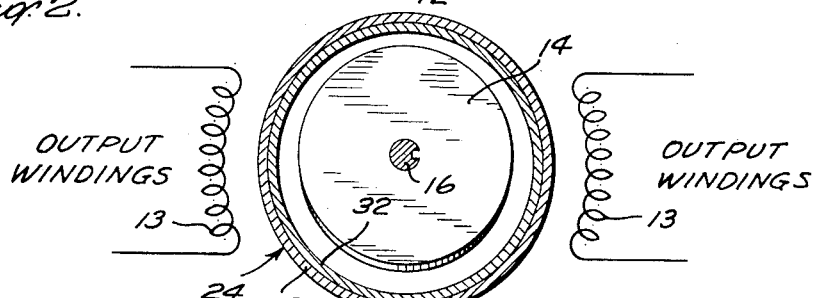
Fig. 2.
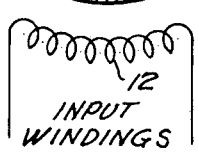
INVENTORS
GEORGE F. SCHROEDER
LEONARD MATERO
BY Victor A. Borst
ATTORNEY 2,738,433
Patented Mar. 13, 1956

United States Patent Office

2,738,433
A.-C. RATE GENERATOR

George F. Schroeder, West Hempstead, and Leonard Matero, Brooklyn, N. Y., assignors to The Sperry Corporation, a corporation of Delaware Application August 28, 1952, Serial No. 306,752

14 Claims. (Cl. 310—171)

The present invention relates to devices for producing alternating current voltages as a function of rotational speeds and more particularly to induction generators of the type generally known as cup A.-C. tachometers or A.-C. rate generators.

Generators of the general type referred to have important uses as velocity feedback elements in systems which employ servomechanisms for follow-up purposes and which require a high degree of stability and accuracy, as for example, computing machines, automatic fire-control mechanisms, radar antenna directing mechanisms and the like. Such a generator consists essentially of a stator usually of laminated iron, a magnetic core usually of laminated iron defining with said stator a magnetic air gap, and an electrically conductive rotor usually non-magnetic and in the form of a cup mounted for rotation in said gap to induce currents therein. This generator is designed, so that when one phase of the stator is excited from a source of voltage having a constant amplitude and a constant frequency, the other stator phase produces by the reaction between these induced currents and the magnetic flux, an output voltage having an amplitude proportional to the speed of said rotor. When the rotor of such a generator is stationary, the voltage of the output winding for ideal performance should be zero. However, due to various lacks and defects of symmetry and homogeneity in the device, a zero-speed or residual voltage is produced which varies according to the rotative position of the rotor. The fundamental element of this residual voltage (i. e. the element having the same frequency as that of the input voltage), seriously affects the accuracy of the generator for control purposes, while the harmonic element of the residual voltage is usually low enough to be negligible, and if high enough may be removed by suitable filters. The residual fundamental voltage is due to a substantial extent to the fact that (1) the magnetic materials in the generator structure and particularly in the magnetic core is unsymmetrical in disposition in relation to the stator and (2) the rotor material is non-homogeneous in composition, producing variations in the resistivity and in the residual permeability of the rotor and therefore producing undesirable variations in the distribution of the currents induced in said rotor.

One object of the present invention is to provide a new and improved method of compensating for dissymmetry in the disposition and distribution of the magnetic materials in the core or stator structure, to reduce the residual fundamental voltage of the generator.

Another object of the present invention is to provide a new and improved method of compensating for non-homogeneity in the rotor composition to reduce the extent of variation in the residual fundamental voltage throughout 360° of rotor positional change.

Another object of the present invention is to provide a new and improved induction generator of the general type referred to, having its magnetic dissymmetries compensated for in a new and novel manner, to reduce its residual fundamental voltage to a minimum for any one position of the rotor.

A further object is to provide a new and improved induction generator of the general type referred to having its rotor constructed and adjusted to compensate for variations in its resistivity and for variations in residual permeability resulting from non-homogeneity in the composition of said rotor, whereby variations in residual fundamental voltage in the different rotative positions of the rotor throughout an electrical cycle is reduced.

In accordance with some features of the present invention, certain magnetic dissymetries in the generator structure are compensated for by utilizing the effect of grain direction on the magnetic properties of the iron in the core or stator laminas to apply an asymmetrical magnetic condition upon a portion or upon the entire magnetic circuit opposing or balancing said dissymmetries. The iron laminas employed in the usual generators of the general type contemplated have a variation in permeability of from ±10% to a possible maximum of ±35% with variation in grain direction. The maximum variation of permeability is a function of the operating flux density of the input winding of the generator.

The necessary orientation in grain direction to impose an asymmetrical condition upon the magnetic circuit is effected by rotating the core or the stator relatively step by step about its axis into different relative rotative positions throughout 360°, until a relative position of minimum residual fundamental voltage is determined. This compensating adjustment removes or reduces the component of the residual fundamental voltage in phase with the input voltage.

The transverse position of the core relative to the stator is then adjusted from concentricity in a direction and to an extent necessary to obtain minimum residual fundamental voltage. This compensating offset of the core or the stator from centered position in the air gap removes or reduces the quadrature component of the residual fundamental voltage.

The compensating adjustments described reduce to a minimum the residual fundamental voltage for any one position of the rotor. For other positions of the rotor, the residual fundamental voltage is not compensated due to the non-homogeneity in the composition of the rotor material. Therefore, when the generator is running, the residual fundamental voltage is amplitude modulated at a frequency proportional to the speed of the rotor. The core adjustments described have little effect on the amount by which the residual fundamental voltage varies with rotor position, but merely change the level about which it varies and shifts its position with respect to rotor angle.

To compensate for non-homogeneity in the composition of the rotor material in accordance with the present invention and to reduce thereby variations in residual fundamental voltage for all rotative positions of the rotor, the rotor is of composite construction comprising two corresponding elements of similar composition and non-homogeneity, in face to face surface conforming engagement. Where the rotor is in the form of a cup, this cup is made up of two cylindrical tubular sections, fitted one over the other. The two interfitted rotor elements are relatively adjusted rotatively and/or translatorily in face to face contact by increments until a complete course is covered, the rotor being rotated after each incremental adjustment, until the rotor has covered an angular distance corresponding at least to an electrical cycle. The residual fundamental voltage of the rotor in different rotative positions of the rotor for each relative incremental adjustment of the rotor component elements is noted and the variation of the residual voltage throughout each electrical cycle thereby determined. The two interfitted rotor elements are then secured together in relatively adjusted position affording minimum variation in residual fundamental voltage throughout the rotor's angular positional cycle. With the rotor so adjusted, the non-homogeneities in the composition of the rotor will be poised and the rotor will consequently be resistively balanced. Whatever residual fundamental voltage remains in the generator may be compensated for by calibration or other well known means as long as it remains at low level and is substantially constant in all rotative positions of the rotor.

Various other objects, features and advantages are apparent from the following particular description and from an inspection of the following drawings, in which:

Fig. 1 is a radial longitudinal section somewhat diagrammatic of an induction rate generator embodying certain structural features of the present invention and illustrating certain method steps by which the compensation of the present invention can be carried out, the eccentrically offset adjustment of the core being shown somewhat exaggerated for the purpose of clarity;

Fig. 2 is transverse section somewhat diagrammatic of the induction rate generator taken approximately along the lines 2—2 of Fig. 1.

Referring to the drawings, the rate generator to which the features of the present invention can be applied, is shown as a 2-phase induction generator comprising a laminated iron stator 10, preferably of the slotted type, fitted in a frame or housing 11 and having concentrated input windings 12 and output windings 13 symmetrically arranged in space so as to be electromagnetically in quadrature. A cylindrical laminated magnetic core 14 of iron is fitted into the frame or housing 11 so as to be substantially concentric with the stator 10 and so as to form therewith a substantially symmetrical annular air gap 15, and defines with said stator a magnetic circuit.

The stator laminas are preferably arranged with their grain directions oriented to average out the permeability of the stator 10 throughout its effective magnetic mass and the core laminas are preferably arranged on and affixed to an arbor 16 with their grain directions extending parallel or in the same direction to afford minimum magnetic asymmetry. However, as far as certain aspects of the invention are concerned, both the stator 10 and the core 14 may have their laminas arranged with the grain direction parallel. In any case, it is preferable to have the laminas of the core 14 or of the stator 10 arranged with their grain directions extending parallel or in the same direction.

The core arbor 16 is shown passing through a sleeve 17 in an end wall 18 of the generator housing 11 for overhanging support and projects outwardly beyond said sleeve. Affixed to the core arbor 16 for abutment with one end of the arbor support 17 is a collar 20 and threaded on the projecting end of said arbor for abutment with the other end of said arbor support is a locking nut 21. A radial slot 22 in the projecting end of the core arbor 16 is adapted to receive a screw driver or other suitable handle member to facilitate angular adjustment of the core 14 for compensating purposes to be described, and a cover structure 23 may be provided removably secured to the housing wall 18 for protectively enclosing the projecting end of the core arbor 16 and the locking nut 21 after all adjustments have been made.

In the air gap 15 between the stator 10 and the core 14 is an electrically conductive rotor 24 usually non-magnetic and preferably in the form of a cylindrical cup secured to a shaft 25 journalled in a bearing 26 in end wall 27 of the generator housing 11. This cup 24 for example, may be made of Magnanin, consisting essentially of copper, and has its skirt encircling the core 14 and substantially concentric therewith, so as to subdivide the air gap 15 into two substantially concentric cylindrical segments.

In operation, the rotor shaft 25 is rotated, while the input stator windings 12 are excited from a voltage source of constant amplitude and constant frequency. This gives a voltage at the output stator windings 13 closely proportional to the speed at which the rotor 24 is driven and a phase nearly fixed with respect to the supply voltage.

When the rotor 24 is stationary, the voltage of the output windings 13 should be zero or close to zero, but owing to various defects in symmetry and homogeneity in the device, a zero-speed residual fundamental voltage appears.

Among the causes for this residual voltage are (1) non-homogeneity in the composition of the rotor material and (2) harmonic voltages contributed by the magnetic iron circuit. These causes (1) and (2) may be remedied in accordance with the method and construction of the present invention.

To compensate for magnetic dissymmetries in the generator, the nut 21 on the core arbor 16 is loosened and the core 14 with respect to the stator 10 is rotated in the air gap 15 to orient its uni-directional grains, until a position of minimum residual fundamental voltage is obtained. This operation removes or at least materially reduces the in phase component of the residual fundamental voltage with respect to the input voltage. As far as certain aspects of the invention are concerned, this in phase component of the residual fundamental voltage may be removed with or without the rotor 24 in the air gap 15. However, for greater accuracy in adjustment, it is preferable that the core 14 be rotated in the air gap 15 for magnetic compensation first without the rotor 24 in the air gap until a position of minimum residual fundamental voltage is obtained. This operation gives an approximate position of minimum residual voltage. The rotor 24 is then placed in any rotative but fixed position in the air gap 15 over the core 14 and the core 14 given its final rotative adjustment into position of minimum residual fundamental voltage. The core 14 is locked in this finally adjusted rotative position by screwing the nut 21 against the support 17 of the core arbor 16.

To remove or at least materially reduce the quadrature component of the residual fundamental voltage, the position of the axis of the core 14 at one end or both ends of the core is adjusted transversely to a slight extent in the air gap 15. In the specific form shown, this eccentric offset adjustment in the position of the core 14 is effected by tilting the core axis from concentricity with respect to the stator. For that purpose, there are provided three adjusting screws 28 threaded into the end wall 18 of the housing 11 and impinging upon the end of the core 14 at three sections spaced 120° apart. By turning the appropriate screw or screws 28, the core arbor 16 supported in overhanging relationship may be deflected at its unsupported end slightly to offset the free end of the core 14 out of air gap concentricity in a direction and to an extent to give minimum residual fundamental voltage. Lock nuts 30 on the screws 28 secure these screws in adjusted position against rotation and the cover structure 23 covers the heads of said screws after all adjustments have been made.

The compensating method of magnetic dissymmetry described deliberately introduces asymmetrical conditions into the magnetic circuit to balance the asymmetric conditions existing in said circuit. This method only compensates for any one position of the rotor 24, but for other positions of the rotor, the residual fundamental voltage is not compensated. The compensating steps applied to the core 24 as described have very little effect on the amount by which the residual fundamental voltage varies with respect to rotor position but merely change the level about which said voltage varies and shift its position with respect to rotor angle. The residual fundamental voltage is amplitude modulated at a frequency proportional to the speed of the rotor 24 when the generator is operating. The variation of residual fundamental voltage with change in rotor position is due mainly to the lack of homogeneity in the composition of the rotor 14 resulting in variation in resistivity and in residual permeability throughout the mass of the rotor and substantally repeats itself during each complete revolution of the rotor according to the number of poles in the stator 10.

Due to the different alloying ingredients in the composition of the rotor, it is difficult to obtain metallurgically a composition which is completely homogeneous throughout its entire mass. To compensate for such non-homogeneity in rotor composition and to reduce thereby the variation in residual fundamental voltage with variations of rotor position to a minimum, the rotor 24 is constructed of two similar elements 32 and 33 arranged for relative adjusting movement. These rotor elements 32 and 33 desirably of tubular cylindrical shape and of equal wall thickness, are shown inserted one inside the other and dimensioned, so that they interfit snugly but nevertheless freely enough to permit these rotor elements to slide relatively rotatively and endwise for adjustment. Both of these rotor elements 32 and 33 are preferably in the form of cups with the shaft 25 secured to the end wall of the inner cup 32, but as far as certain aspects of the invention are concerned, the outside rotor element 33 may simply be a cylindrical sleeve free of any walls.

The two component elements 32 and 33 of the rotor 24 are adjusted in relative position, so that the non-homogeneity in the composition of one element is counterbalanced by the non-homogeneity in the composition of the other element. To facilitate such adjustment, these component elements 32 and 33 of the rotor 24 should be derived from adjoining pieces of barstock, so that these elements will have the same variations in resistivity and in residual permeability and should be machined with precision.

To compensate for non-homogeneity in the composition of the rotor 24, its two component elements 32 and 33 are relatively adjusted an angular increment and turned step by step through 360°, the residual fundamental voltage being noted or plotted for graphing at the end of each step. The two rotor component elements 32 and 33 are then relatively adjusted an additional angular increment and the rotor 14 turned step by step through 360°, to note the variation in residual fundamental voltage with different rotor positions, this operation being repeated, until the two rotor elements have been angularly adjusted relatively through a completed revolution. The variation in residual fundamental voltage substantially repeats itself every 180 electrical degrees of rotor rotation or every 90° mechanical degrees of rotor rotation for the specific 2 pole per phase machine shown. However, it is desirable to rotate the rotor through 360° at the end of each incremental adjustment, to average out any deviations in correspondence between successive voltage cycles throughout a 360° course.

After the relative rotative position of the rotor elements 32 and 33 to afford minimum variations in residual fundamental voltage has been determined in the manner described, these elements are adjusted while in this position endwise in increments and the rotor is turned step by step through 360° at the end of each incremental adjustment, to determine the relative endwise position of said rotor elements affording minimum variation in residual fundamental voltage.

After the proper relative position of the rotor elements 32 and 33 both relatively and endwise has been determined in the manner described, the two elements are fixed in this position by any suitable means, but desirably by the use between their peripheral walls of an adhesive. A suitable composition for the purpose is a varnish and more specifically one having a melamine resin base.

The induction generator adjusted as described, will have the level of its residual fundamental voltage and the variation in said voltage for different rotor positions materially reduced. Whatever residual fundamental voltage does remain is constant enough for different rotor positions to be compensated for by proper calibration or other suitable well-known means.

While the invention has been described with particular reference to a specific embodiment, it is to be understood that it is not to be limited thereto but is to be construed broadly and restricted solely by the scope of the appended claims.

What is claimed is:

1. The method of compensating for magnetic dissymmetries in an alternating flux machine having a core member and a stator member forming part of a magnetic circuit, a rotor, and input and output windings coupled through rotation of said rotor, which method comprises orienting the grains in the two members by rotating relatively the core member and the stator member while said members are in place in said machine, until said members are located in relative rotative positions of minimum magnetic dissymmetry, and moving one of said members in a general direction transverse to the axis of the stator member, until said members are located in relative eccentric positions of minimum magnetic dissymmetry.

2. The method of reducing the level of residual fundamental output voltage at zero rotor speed in an alternating flux machine having a rotor, cylindrical laminated iron core member, a laminated iron stator member defining with said core member part of the magnetic circuit of the machine, and input and output windings in non-inductive relationship coupled by rotation of said rotor, which method comprises locating the laminations in one of said members so that the grains in said laminations extend in one direction, and rotating relatively said members while said members are in place in said machine to orient the grains in the two members in directions to reduce the component of the residual voltage in phase with the input voltage, until the relative rotative positions of minimum residual voltage is determined for said members.

3. The method of reducing the level of residual fundamental output voltage at zero rotor speed in an alternating flux machine having a rotor, a cylindrical laminated iron core and a laminated iron stator located on an axis coincident with the axis of said core and defining with said core part of the magnetic circuit of the machine, and input and output windings in non-inductive relationship coupled by rotation of said rotor, which method comprises locating the laminations in one of said members, so that the grains in said laminations extend in one direction, rotating relatively said members while said members are in place in said machine to orient the grains in the two members in directions to reduce the component of the residual voltage in phase with the input voltage, until the relative rotative positions of minimum residual voltage is determined for said members, and moving one of said members in a general direction transverse to the axis of the stator member, until said members are located in relative eccentric positions of minimum magnetic dissymmetry.

4. The method of reducing the level of residual fundamental output voltage at zero rotor speed in an alternating flux machine having a rotor, a core member and a stator member forming part of a magnetic circuit, and input and output windings coupled through rotation of said rotor, which method comprises moving one of said members in a general direction transverse to the axis of the stator member, until said members are located in relative eccentric positions affording minimum residual fundamental voltage.

5. The method of reducing the level of residual fundamental output voltage at zero rotor speed in an alternating flux machine having a rotor, a core member and a stator member on coincident axes forming part of a magnetic circuit, and input and output windings coupled through rotation of said rotor, which method comprises tilting one of said members transverse to its axis until said members are located at one end in relative eccentric positions affording minimum residual fundamental voltage.

6. The method of reducing the variations in the residual fundamental output voltage with different rotor positions in an alternating flux machine having an electrically conductive rotor, a core member and a stator member forming part of a magnetic circuit, and input and output windings coupled through rotation of said rotor, which method comprises providing a composite rotor having similar component elements of similar non-homogeneities and adjusting said elements relatively to balance the non-homogeneity of one element against that of the other, until a relative adjustment affording minimum residual voltage with different rotor positions is obtained.

7. The method of reducing the variations in the residual fundamental output voltage with different rotor positions in an alternating flux machine having an electrically conductive rotor, a core member and a stator member forming part of a magnetic circuit, and input and output windings coupled through rotation of said rotor, which method comprises providing a tubular composite rotor having similar tubular component elements of similar non-homogeneities fitted snugly one inside the other, and adjusting said rotor elements relatively to balance the non-homogeneity of one element against that of the other, until a relative adjustment affording minimum residual voltage with different rotor positions is obtained.

8. The method of reducing the variations in the residual fundamental output voltage with different rotor positions in an alternating flux machine having an electrically conductive rotor, a core member and a stator member forming part of a magnetic circuit, and input and output windings coupled through rotation of said rotor, which method comprises providing a composite rotor having similar component elements fitted snugly one inside the other and derived from adjoining pieces of a common barstock, whereby said elements will have similar non-homogeneities, and rotatively adjusting said rotor elements relatively to balance the non-homogeneity of one element against that of the other element, until a relative adjustment affording minimum residual voltage variation with different rotor positions is obtained.

9. An alternating flux machine comprising a stator member and a cylindrical core member disposed in encircling relationship and conjointly defining part of the magnetic circuit of the machine, one of said members being laminated, the grains in all the laminas of the laminated member extending in the same direction, input and output windings in non-inductive relationship, and a rotor dynamically coupling said windings, said members being in relative rotative positions to orient the grains in the two members for minimum residual fundamental voltage.

10. An alternating flux machine having a stator and a core in encircling relationship defining conjointly part of the magnetic circuit of the machine, input and output windings in noninductive relation, a rotor dynamically coupling said windings, and means for adjustably moving said core and said stator relatively in general directions transverse to the axis of the stator to compensate for inherent magnetic dissymmetry in the machine.

11. An alternating flux machine having a magnetic stator and a magnetic core in encircling relationship separated by an air gap, input and output windings in non-inductive relation, and an electrically conductive composite rotor in said air gap constructed of two similar component elements of similar composition in relative position to balance substantially the non-homogeneity in the composition of one element with that of the other, and to reduce thereby inherent magnetic dissymmetry in the machine due to non-homogeneity in the composition of the rotor.

12. An alternating flux machine having a magnetic stator and a magnetic core in encircling relationship separated by an air gap, input and output windings in non-inductive relation, and an electrically conductive cylindrical rotor in said air gap for coupling said windings upon rotation constructed of similar tubular component elements fitted snugly one inside the other and derived from adjoining pieces of a barstock, whereby said component elements have similar non-homogeneities in composition, said component rotor elements being in relative position to balance substantially the non-homogeneity of one element with that of the other, whereby minimum variation in the residiual fundamental voltage of the machine with different rotor position can be obtained.

13. An electrically conductive rotor for coupling in an alternating flux machine input and output windings disposed in non-inductive relation, said rotor being compositely constructed of two similar component elements of similar non-homogeneities in composition disposed in relative position to balance the non-homogeneities of said elements, whereby inherent magnetic dissymmetry in the machine due to non-homogeneity in the composition of the rotor is reduced to a minimum.

14. An electrically conductive rotor for coupling in an alternating flux machine input and output windings disposed in non-inductive relation, said rotor being compositely constructed of similar tubular component elements fitted snugly one inside the other and positioned relatively to balance substantially the non-homogeneity in composition of one element with that of the other, whereby minimum variation in the residual fundamental voltage of the machine with different rotor positions can be obtained.

References Cited in the file of this patent

UNITED STATES PATENTS

| | | |
|---|---|---|
| 1,521,301 | Jones | Dec. 30, 1924 |
| 1,809,197 | Fendrich | June 9, 1931 |
| 1,972,987 | Gardeen | Sept. 11, 1934 |
| 2,206,920 | Riggs | July 9, 1940 |
| 2,519,365 | Goertz | Aug. 22, 1950 |

FOREIGN PATENTS

| | | |
|---|---|---|
| 644,773 | Great Britain | Oct. 18, 1950 |